(12) United States Patent
Wagenhoffer

(10) Patent No.: US 10,912,291 B2
(45) Date of Patent: Feb. 9, 2021

(54) SPLIT SHOT FISHING LINE WEIGHT

(71) Applicant: Frank Wagenhoffer, Boonton, NJ (US)

(72) Inventor: Frank Wagenhoffer, Boonton, NJ (US)

( * ) Notice: Subject to any disclaimer, the term of this patent is extended or adjusted under 35 U.S.C. 154(b) by 192 days.

(21) Appl. No.: 15/708,265

(22) Filed: Sep. 19, 2017

(65) Prior Publication Data
US 2018/0077915 A1 Mar. 22, 2018

Related U.S. Application Data

(60) Provisional application No. 62/397,280, filed on Sep. 20, 2016.

(51) Int. Cl.
*A01K 95/00* (2006.01)

(52) U.S. Cl.
CPC .................. *A01K 95/005* (2013.01)

(58) Field of Classification Search
CPC .............. A01K 95/00; A01K 95/005
USPC ............. 43/44.9, 44.91, 43.1, 44.89
See application file for complete search history.

(56) References Cited

U.S. PATENT DOCUMENTS

| | | | | |
|---|---|---|---|---|
| 1,259,664 A * | 3/1918 | Peters | ........... | A01K 95/00 24/135 R |
| 1,549,121 A * | 8/1925 | Knill | ........... | A01K 95/00 43/43.1 |
| 2,535,907 A * | 12/1950 | Dolejs | ........... | A01K 93/00 43/44.92 |
| 2,601,736 A * | 7/1952 | Fisher | ........... | A01K 93/00 43/43.11 |
| 2,663,113 A * | 12/1953 | Tongson | ........... | A01K 95/00 24/129 R |
| 2,966,001 A * | 12/1960 | Sader | ........... | A01K 97/06 43/44.95 |
| 4,949,645 A * | 8/1990 | Hayward | ........... | A01K 95/005 102/459 |
| 8,656,634 B2 * | 2/2014 | Farley | ........... | A01K 93/00 43/44.91 |
| 2001/0015029 A1 * | 8/2001 | Carter | ........... | A01K 95/005 43/44.81 |
| 2009/0044441 A1 * | 2/2009 | Neal | ........... | A01K 91/04 43/44.83 |

* cited by examiner

*Primary Examiner* — Magdalena Topolski
*Assistant Examiner* — Marisa V Conlon
(74) *Attorney, Agent, or Firm* — Sean R. Wilsusen, Esq.; Carter, DeLuca & Farrell LLP

(57) ABSTRACT

A fishing line weight according to an exemplary embodiment of the present invention includes a first tungsten body including a first hole, a first projection and a first groove. A second tungsten body includes a second hole substantially aligned with the first hole, a second projection substantially aligned with the first groove and a second groove substantially aligned with the first projection. A copper pin is disposed in the first hole and the second hole. The first tungsten body is unconnected from the second tungsten body.

20 Claims, 3 Drawing Sheets

SPLIT SHOT FISHING LINE WEIGHT

CROSS-REFERENCE TO RELATED APPLICATION

This U.S. Non-Provisional patent application claims priority to U.S. Provisional Patent Application No. 62/397,280, filed on Sep. 20, 2016, the disclosure of which is incorporated by reference herein in its entirety.

FIELD OF THE INVENTION

The present invention relates to a fishing line weight. One or more exemplary embodiments of the present invention provide a split shot fishing line weight including at least two tungsten bodies.

SUMMARY

An exemplary embodiment of the present invention provides a fishing line weight including a first tungsten body including a first hole, a first projection and a first groove. A second tungsten body includes a second hole substantially aligned with the first hole, a second projection substantially aligned with the first groove and a second groove substantially aligned with the first projection. A copper pin is disposed in the first hole and the second hole. The first tungsten body is unconnected from the second tungsten body.

According to an exemplary embodiment of the present invention, at least one of the first and second bodies may have a substantially semi-circular shape.

According to an exemplary embodiment of the present invention, when the first projection is disposed in the second groove and the second projection is disposed in the first groove, the first and second tungsten bodies may form a substantially spherical shape.

According to an exemplary embodiment of the present invention, the copper pin may have a substantially cylindrical shape.

According to an exemplary embodiment of the present invention, a first portion of the copper pin may substantially fill the first hole. A second portion of the copper pin may substantially fill the second hole.

According to an exemplary embodiment of the present invention, an outermost end of the first portion of the copper pin may be substantially flush with a side of the first tungsten body facing away from the first projection.

According to an exemplary embodiment of the present invention, an outermost end of the second portion of the copper pin may be substantially flush with a side of the second tungsten body facing away from the second projection.

According to an exemplary embodiment of the present invention, each of the first and second tungsten bodies may have semi-circular shapes. A first flat surface of the first tungsten body may be configured to be in direct contact with a second flat surface of the second tungsten body when pressure is applied to at least one of the first and second tungsten bodies along a length of the copper pin.

According to an exemplary embodiment of the present invention, when the first projection is disposed in the second groove and the second projection is disposed in the first groove, the first and second tungsten bodies may form a substantially spherical shape.

According to an exemplary embodiment of the present invention, a fishing line weight includes a first tungsten body including a first hole and a second tungsten body including a second hole substantially aligned with the first hole. A copper pin is disposed in the first hole and the second hole. The first tungsten body is unconnected from the second tungsten body.

An exemplary embodiment of the present invention provides a fishing line weight including a first tungsten body including a first hole, a first projection and a first groove. The first hole is formed through an entire depth of the first tungsten body. A second tungsten body includes a second hole substantially aligned with the first hole, a second projection substantially aligned with the first groove and a second groove substantially aligned with the first projection. The second hole is formed through substantially an entire depth of the second tungsten body. A copper pin is disposed in the first hole and the second hole. The first tungsten body is unconnected from the second tungsten body.

According to an exemplary embodiment of the present invention, the copper pin may project through at least one of the first and second holes when the first and second tungsten bodies are in direct contact with each other According to an exemplary embodiment of the present invention, the fishing line weight may be disposed on monofilament or fluorocarbon fishing line.

According to an exemplary embodiment of the present invention, at least one of the first and second tungsten bodies may include a fishing line groove configure to hold a fishing line compressed between the first and second tungsten bodies.

According to an exemplary embodiment of the present invention, a first fishing line groove may be formed in the first tungsten body and a second fishing line groove may be formed in the second tungsten body.

According to an exemplary embodiment of the present invention, the first fishing line groove may be substantially aligned with the second fishing line groove when the first and second tungsten bodies are compressed together.

According to an exemplary embodiment of the present invention, the first fishing line groove and the second fishing line groove may form a substantially cylindrical shape when the first and second tungsten bodies are compressed together.

BRIEF DESCRIPTION OF THE FIGURES

The above and other features of the present invention will become more apparent by describing in detail exemplary embodiments thereof, with reference to the accompanying drawings, in which.

DETAILED DESCRIPTION

Figure 1A:
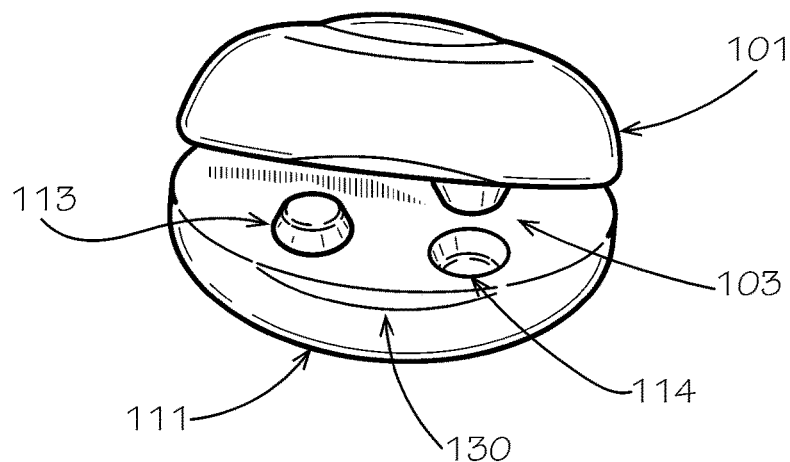
FIG. 1A illustrates a front view of a split shot fishing line weight according to an exemplary embodiment of the present invention.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

Variations in the shapes and sizes of the metal components described herein may occur, such as during manufacturing and/or as a result of the inherent chemical properties of the metal components described herein.

Split shot fishing line weights are commonly made from lead because lead is easily compressed around a fishing line and reused by removing the lead split shot weight from a fishing line after use. However, contact with lead, particularly when it is manipulated (thus sloughing off lead particles) may result in undesired biological and environmental implications. For example, contact with lead or lead particles or fragments may lead to lead exposure or consumption. Lead is a widely recognized as a highly poisonous metal (whether inhaled or swallowed), affecting almost every organ and system in the body. The component limit of lead (1.0 µg/g) is a test benchmark for pharmaceuticals, representing the maximum daily intake an individual should have. Even at such relatively low levels, lead intake can be hazardous to human beings. Exposure to lead and lead chemicals can occur through ingestion, inhalation or by direct contact.

Tungsten, which may also be referred to a wolfram, is a chemical element with symbol W and atomic number 74. Tungsten is a relatively hard metal. In its raw form, tungsten is a hard steel-grey metal that is often substantially brittle. Tungsten's high density is 19.3 times that of water, comparable to that of uranium and gold, and much higher (about 1.7 times) than that of lead. Polycrystalline tungsten may be an intrinsically brittle and substantially hard material, thus making it difficult to work. Substantially pure single-crystalline tungsten is more ductile, and can be cut with a hard-steel hacksaw. However, pure single-crystalline tungsten may be relatively expensive and therefore less desirable for producing relatively low cost commercial products. Thus, it may be difficult to utilize tungsten to form a single-bodied split shot fishing wait that is compressible over fishing line because tungsten has a tendency to crack when bent or compressed, particularly when formed into relatively small shapes.

The split shot fishing line weight according to exemplary embodiments of the present invention is 100% lead free, thus avoiding the inherent risks of a lead split shot weight.

Tungsten is relatively more dense than lead (19.25 g/cm$^3$ vs. 11.34 g/cm$^3$), and thus tungsten may be used to form a relatively heavier and smaller split shot fishing line weight compared with lead. A relatively smaller split shot fishing line weight including tungsten, as described herein, may be useful with relatively thin fishing line or with fishing techniques (e.g., fly fishing) employing relatively light lures or baits. A relatively smaller split shot fishing line weight may have better hydrodynamic properties (e.g., less drag when being moved through the water, less visibility to fish and may allow for better feedback through the fishing line to a user's hand by creating less water resistance than a lead weight.

Copper is a chemical element with symbol Cu and atomic number 29. Copper is a relatively soft, malleable and ductile metal. Copper may be combined with other metals such as brass or bronze to form a metal alloy when greater hardness is desired.

The split shot fishing line weight according to exemplary embodiments of the present invention may be opened and closed multiple times for easy use and re-use, despite the relatively brittle nature of tungsten. The relatively soft and pliable copper pin described herein may allow easy use and re-use of the split shot fishing line weight according to exemplary embodiments of the present invention. However, exemplary embodiments of the present invention are not limited to a copper pin, and any relatively pliable metal may replace the copper pin, as desired.

Figure 1B:
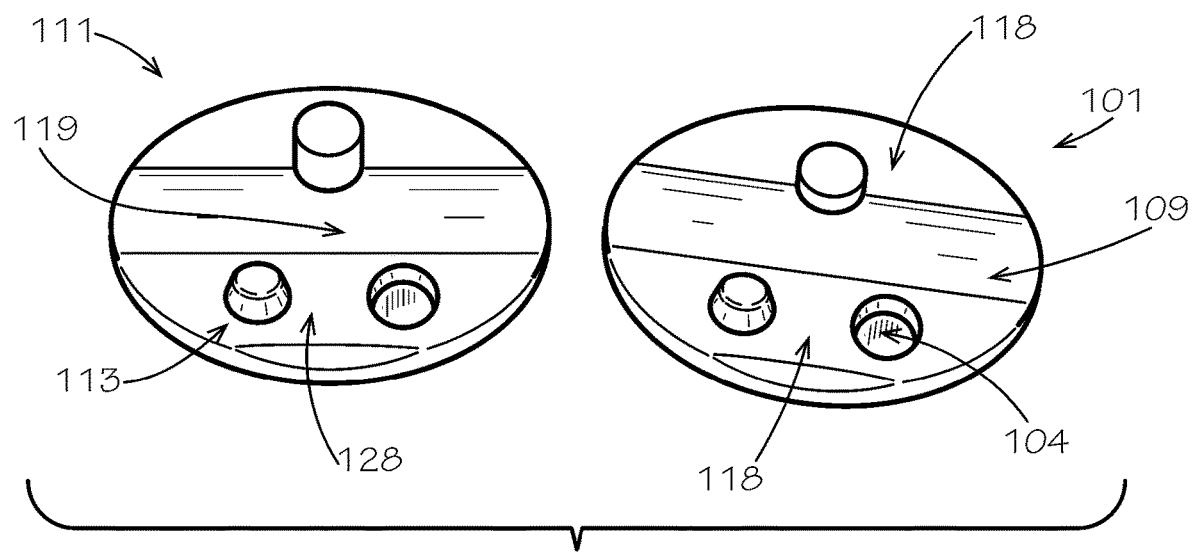
FIG. 1B illustrates a first tungsten body and a second tungsten body of a split shot fishing line weight separated from each other according to an exemplary embodiment of the present invention.
Figure 2:
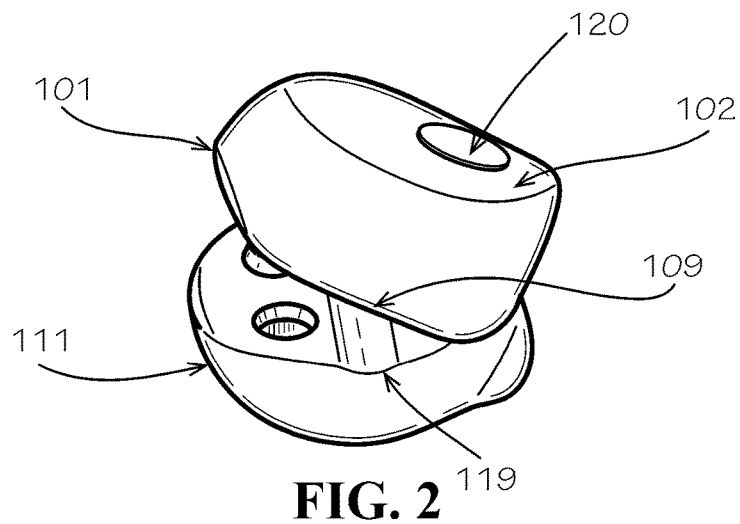
FIG. 2 illustrates a side angled view of a first side of a split shot fishing line weight according to an exemplary embodiment of the present invention.
Figure 3:
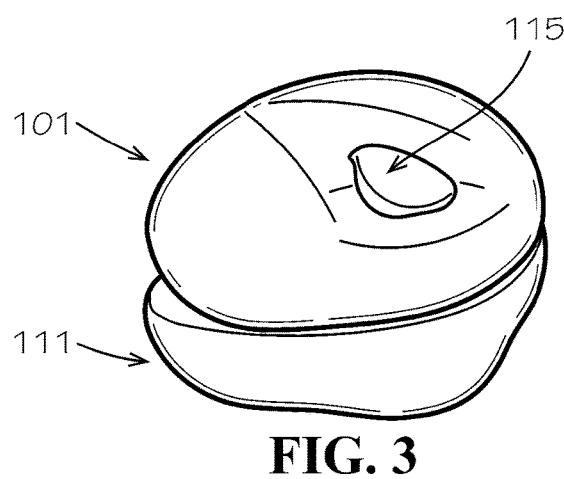
FIG. 3 illustrates a rear angled view of a split shot fishing line weight according to an exemplary embodiment of the present invention.
Figure 4:
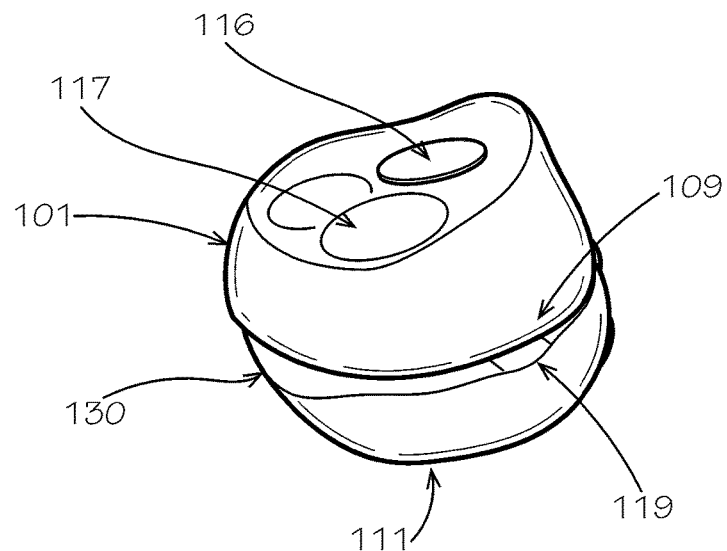
FIG. 4 illustrates a side angled view of a second side of a split shot fishing line weight according to an exemplary embodiment of the present invention.
Figure 5:
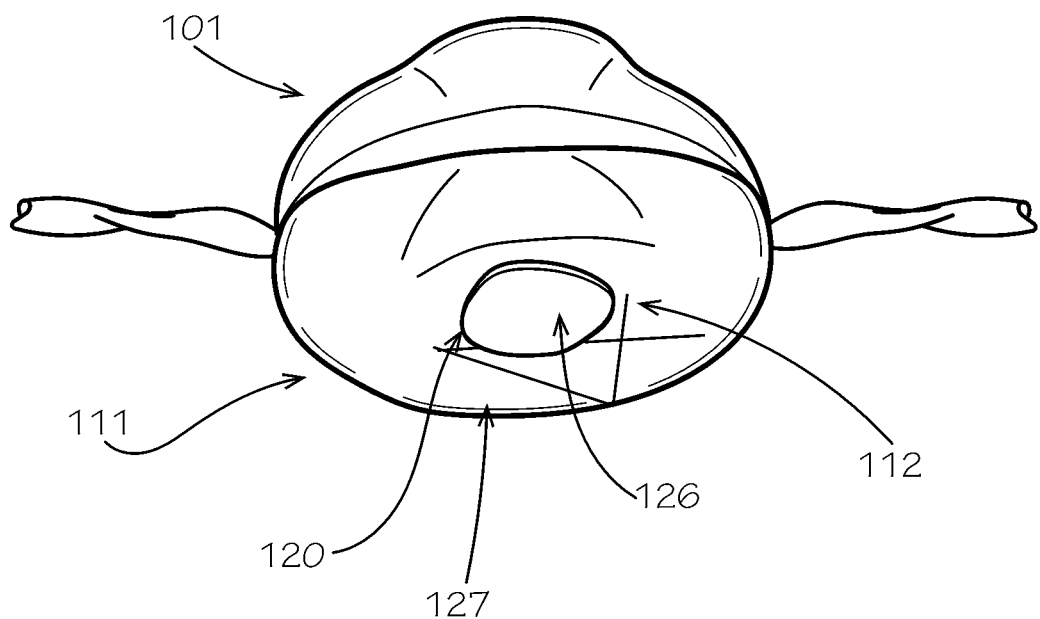
FIG. 5 illustrates a first view of a split shot fishing line weight compressed around a fishing line according to an exemplary embodiment of the present invention.
Figure 6:
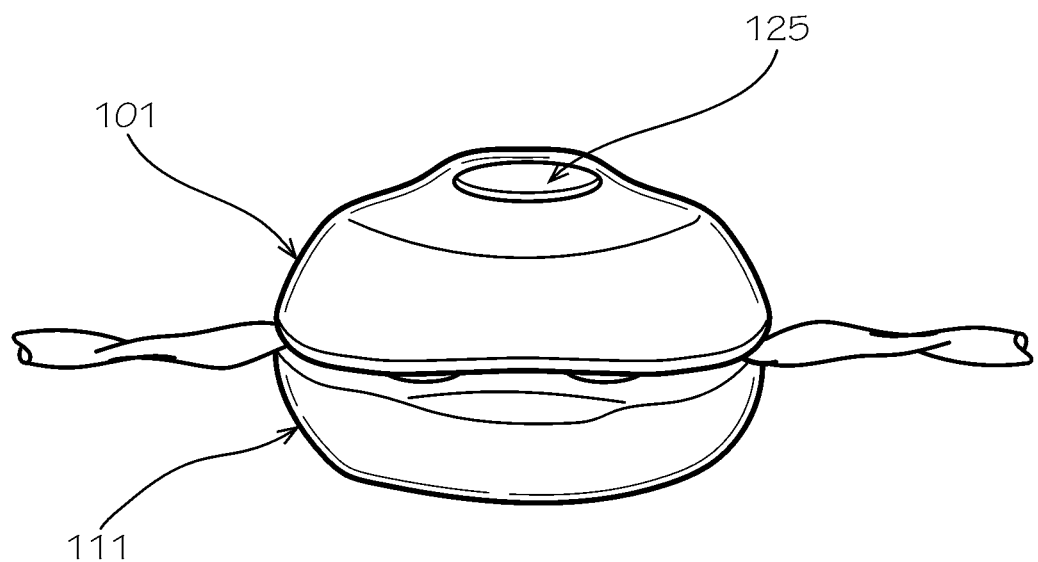
FIG. 6 illustrates a second view of a split shot fishing line weight compressed around a fishing line according to an exemplary embodiment of the present invention.

FIG. 1A illustrates a front view of a split shot fishing line weight according to an exemplary embodiment of the present invention. FIG. 1B illustrates a first tungsten body and a second tungsten body of a split shot fishing line weight separated from each other according to an exemplary embodiment of the present invention. FIG. 2 illustrates a side angled view of a first side of a split shot fishing line weight according to an exemplary embodiment of the present invention. FIG. 3 illustrates a rear angled view of a split shot fishing line weight according to an exemplary embodiment of the present invention. FIG. 4 illustrates a side angled view of a second side of a split shot fishing line weight according to an exemplary embodiment of the present invention. FIG. 5 illustrates a first view of a split shot fishing line weight compressed around a fishing line according to an exemplary embodiment of the present invention. FIG. 6 illustrates a second view of a split shot fishing line weight compressed around a fishing line according to an exemplary embodiment of the present invention.

Referring to FIG. 1A, FIG. 1B and FIGS. 2-6 a fishing line weight according to an exemplary embodiment of the present invention may include a first tungsten body 101 including a first hole 102, a first projection 103 and a first groove 104. A second tungsten body 111 may include a second hole 112 substantially aligned with the first hole 102, a second projection 113 substantially aligned with the first groove 104 and a second groove 114 substantially aligned with the first projection 103. A copper pin 120 may be disposed in the first hole 102 and the second hole 112. The first tungsten body 101 may be unconnected from the second tungsten body 111.

According to an exemplary embodiment of the present invention, the fishing line weight may be referred to as a split shot fishing line weight. The terms "fishing line weight" and "split shot fishing line weight" and "split shot weight" may be used interchangeably herein. A fishing line (see, e.g., FIGS. 5 and 6) may be compressed between the first tungsten body 101 and the second tungsten body 111 to substantially immovably attach the split shot fishing line weight to a fishing line. Thus, the split shot fishing line weight be may substantially immovably coupled to a fishing line to add weight to the fishing line (e.g., for further casting or increased sink rate), as desired.

According to exemplary embodiments of the present invention, the split shot fishing line weight may have various sizes and various weights. For example, the sizes of the split shot fishing line weight may include AB, BB, #1, #2, #3, #4, #5, #6, #7, #8. Weights of the split shot fishing line weight may include 1.0, 0.9, 0.8, 0.7, 0.6, 0.5, 0.5, 0.4, 0.2 and 0.1 grams. However, exemplary embodiments of the present invention are not limited thereto, and the split shot fishing line weight may be any desired size or weight. For example, relatively small/light split shot fishing line weights may be desirable for fly fishing or fresh water fishing, while relatively large/heavy split shot fishing line weights may be desirable for salt water fishing or fishing in current.

According to exemplary embodiments of the present invention, the split shot fishing line weight may be couple to any desired form of fishing line, such as, for example, monofilament, fluorocarbon or braided line. According to exemplary embodiments of the present invention, the split shot fishing line weight may be couple to any desired gauge or thickness of line, such as, for example, 1 LB test to 100 LB test.

The copper pin 120 may allow the relatively brittle first tungsten body 101 and second tungsten body 111 to be compressed together to couple the split shot fishing line weight to a fishing line, as discussed below in more detail. However, exemplary embodiments of the present invention are not limited to a copper pin, and the copper pin may be replaced with another similarly pliable metal or a metal alloy with similar properties to copper (e.g., similar strength and ductility).

According to an exemplary embodiment of the present invention, at least one of the first and second bodies 101 and 111 may have a substantially semi-circular shape. The semi-circular shape may make the split shot fishing line weight less likely to be snagged in weed or grass and may maintain a relatively low profile around a fishing line.

According to an exemplary embodiment of the present invention, when the first projection 103 is disposed in the second groove 114 and the second projection 113 is disposed in the first groove 104, the first and second tungsten bodies 101 and 111 may form a substantially spherical shape. When the first projection 103 is disposed in the second groove 114 and the second projection 113 is disposed in the first groove 104 the first and second tungsten bodies 101 and 111 may be substantially aligned with each other.

According to an exemplary embodiment of the present invention, the copper pin 120 may have a substantially cylindrical shape. However, exemplary embodiments of the present invention are not limited thereto, and the copper pin 120 may have any desired shape.

According to an exemplary embodiment of the present invention, a first portion 115 of the copper pin 120 may substantially fill the first hole 102. A second portion 125 of the copper pin 120 may substantially fill the second hole 112. The copper pin 120 may be coupled to each of the first and second tungsten bodies 101 and 111 through pressure applied between the first and second tungsten bodies 101 and 111 in the first and second holes 102 and 112 of the first and second tungsten bodies 101 and 111 and the copper pin 120. That is, the copper pin 120 may be forcefully inserted into the first and second holes 102 and 112 of the first and second tungsten bodies 101 and 111 to couple the copper pin 120 to the first and second tungsten bodies 101 and 111.

According to an exemplary embodiment of the present invention, an adhesive may be applied between the copper pin 120 and the first and second tungsten bodies 101 and 111 in the first and second holes 102 and 112.

According to an exemplary embodiment of the present invention, an outermost end 116 of the first portion 115 of the copper pin 120 may be substantially flush with a side 117 of the first tungsten body 101 facing away from the first projection 103. That is, the copper pin 120 may be disposed in the first hole 102 in such a way that the substantially spherical shape of the split shot fishing line weight is maintained.

According to an exemplary embodiment of the present invention, an outermost end 126 of the second portion 125 of the copper pin 120 may be substantially flush with a side 127 of the second tungsten body 111 facing away from the second projection 113. That is, the copper pin 120 may be disposed in the second hole 112 in such a way that the substantially spherical shape of the split shot fishing line weight is maintained.

According to an exemplary embodiment of the present invention, each of the first and second tungsten bodies 101 and 111 may have semi-circular shapes. A first flat surface 118 of the first tungsten body 101 may be configured to be in direct contact with a second flat surface 128 of the second tungsten body 111 when pressure is applied to at least one of the first and second tungsten bodies 101 and 111 along a length of the copper pin 120.

According to an exemplary embodiment of the present invention, when the first projection 103 is disposed in the second groove 114 and the second projection 113 is disposed in the first groove, 104 the first and second tungsten bodies 101 and 111 may form a substantially spherical shape. When the first projection 103 is disposed in the second groove 114 and the second projection 113 is disposed in the first groove, 104 the first and second tungsten bodies 101 and 111 may be substantially aligned with each other when in a closed state (e.g., when coupled to a fishing line).

According to an exemplary embodiment of the present invention, a fishing line weight may include the first tungsten body 101 including the first hole 102 and the second tungsten body 111 including the second hole 112 substantially aligned with the first hole 102. The copper pin 120 may be disposed in the first hole 102 and the second hole 112. The first tungsten body 101 may be unconnected from the second tungsten body 111.

An exemplary embodiment of the present invention provides a fishing line weight may include the first tungsten body 101 including the first hole 102, the first projection 103 and the first groove 104. The first hole 102 may be formed through substantially an entire depth of the first tungsten body 101. The second tungsten body 111 may include the second hole 112 substantially aligned with the first hole 102, the second projection 113 substantially aligned with the first groove 104 and the second groove 114 substantially aligned with the first projection 103. The second hole 112 may be formed through substantially an entire depth of the second tungsten body 111. The copper pin 120 may be disposed in the first hole 102 and the second hole 112. The first tungsten body 101 may be unconnected from the second tungsten body 111.

According to an exemplary embodiment of the present invention, the copper pin 120 may project through at least one of the first and second holes 102 and 112 when the first and second tungsten bodies 101 and 111 are in direct contact with each other According to an exemplary embodiment of the present invention, the fishing line weight may be disposed on monofilament or fluorocarbon fishing line.

According to an exemplary embodiment of the present invention, at least one of the first and second tungsten bodies 101 and 111 may include a fishing line groove configure to hold a fishing line compressed between the first and second tungsten bodies 101 and 111.

According to an exemplary embodiment of the present invention, a first fishing line groove 109 may be formed in the first tungsten body 101 and a second fishing line groove 119 may be formed in the second tungsten body 111.

According to an exemplary embodiment of the present invention, the first fishing line groove 109 may be substantially aligned with the second fishing line groove 119 when the first and second tungsten bodies 101 and 111 are compressed together to be coupled to a fishing line.

According to an exemplary embodiment of the present invention, the first fishing line groove 109 and the second fishing line groove 119 may form a substantially cylindrical shape when the first and second tungsten bodies 101 and 111 are compressed together.

The first fishing line groove 109 and/or the second fishing line groove 119 may reduce or prevent crushing of, and therefore damage to, a fishing line that the split shot fishing line weight according to exemplary embodiments of the present invention is coupled to.

According to an exemplary embodiment of the present invention, each of the first and second tungsten bodies 101 and 111 may include about 97.7% tungsten and about 2.3% nickel. However, exemplary embodiments of the present invention are not limited thereto. For example, more or less tungsten may be included in at least one of the first and second tungsten bodies 101 and 111, and tungsten may be mixed with one or more other metals.

According to an exemplary embodiment of the present invention, the copper pin 120 may be replaced with a pin including a metal other than copper, such as, for example, aluminum, steel or a metal alloy including copper, aluminum or steel.

According to an exemplary embodiment of the present invention, at least one of the first and second tungsten bodies 101 and 111 may include a metal other than tungsten, such as bismuth.

According to an exemplary embodiment of the present invention, at least one of the first and second tungsten bodies 101 and 111 may include an insertion wedge 130. The insertion wedge 130 may be used to separate the first and second tungsten bodies 101 and 111 from each other to decouple the first and second tungsten bodies 101 and 111 from a fishing line. For example, the split shot fishing line weight may be removed from a fishing line and saved for later use. The insertion wedge 130 may assist in guiding a separation tool (e.g., a screwdriver) in between the first and second tungsten bodies 101 and 111 to bend the first and second tungsten bodies 101 and 111 away from each other.

The disclosures of each of the references, patents and published patent applications disclosed herein are each incorporated by reference herein in their entireties.

In the event of a conflict between a definition herein and a definition incorporated by reference, the definition provided herein is intended.

Having described exemplary embodiments of the present invention, it is further noted that it is readily apparent to those of ordinary skill in the art that various modifications may be made without departing from the spirit and scope of the present invention.

What is claimed is:

1. A fishing line weight, comprising:
a first tungsten body comprising a first hole, a first projection and a first groove;
a second tungsten body comprising a second hole substantially aligned with the first hole, a second projection substantially aligned with the first groove and a second groove substantially aligned with the first projection, the second tungsten body defining a substantially flat surface facing the first tungsten body; and
a copper pin disposed in the first hole and the second hole at a position offset from a center line of the first tungsten body or the second tungsten body,
wherein the first tungsten body is a separately formed component from the second tungsten body,
wherein the copper pin operates as a flexible pivot point for reversibly pivoting the first tungsten body relative to the second tungsten body to capture a fishing line at a position spaced apart from the copper pin,
wherein a size of the first tungsten body is substantially the same as a size of the second tungsten body,
wherein the first tungsten body and second tungsten body are configured to pivot toward each other in a clamshell arrangement to capture the fishing line between the first tungsten body and the second tungsten body, and
wherein the first tungsten body and the second tungsten body are configured to pivot away from each other in the clamshell arrangement to release the fishing line captured between the first tungsten body and the second tungsten body.

2. The fishing line weight of claim 1, wherein at least one of the first and second bodies has a substantially semi-circular shape.

3. The fishing line weight of claim 2, wherein when the first projection is disposed in the second groove and the second projection is disposed in the first groove, the first and second tungsten bodies form a substantially spherical shape.

4. The fishing line weight of claim 3, wherein the copper pin has a substantially cylindrical shape.

5. The fishing line weight of claim 4, wherein a first portion of the copper pin substantially fills the first hole, and wherein a second portion of the copper pin substantially fills the second hole.

6. The fishing line weight of claim 5, wherein an outermost end of the first portion of the copper pin is substantially flush with a side of the first tungsten body facing away from the first projection.

7. The fishing line weight of claim 1, wherein each of the first and second tungsten bodies have semi-circular shapes, and wherein a first flat surface of the first tungsten body is configured to be in direct contact with a second flat surface of the second tungsten body when pressure is applied to at least one of the first and second tungsten bodies along a length of the copper pin.

8. The fishing line weight of claim 7, wherein when the first projection is disposed in the second groove and the second projection is disposed in the first groove, the first and second tungsten bodies form a substantially spherical shape.

9. The fishing line weight of claim 1, wherein the first tungsten body or the second tungsten body includes a fishing line receiving groove extending along the center line of the first tungsten body or the second tungsten body, the fishing line receiving groove spaced apart from the copper pin and configured to secure the fishing line therein upon pivoting the first tungsten body and the second tungsten body toward each other.

10. The fishing line weight of claim 1, further including an insertion wedge formed in the second tungsten body, the insertion wedge defining a surface that is angled with respect to the substantially flat surface of the second tungsten body, wherein pressure applied to the surface of the insertion wedge pivots the second tungsten body away from the first tungsten body in the clamshell arrangement.

11. A fishing line weight, comprising:
- a first tungsten body comprising a first hole, a first projection and a first groove, wherein the first hole is formed through an entire depth of the first tungsten body;
- a second tungsten body comprising a second hole substantially aligned with the first hole, a second projection substantially aligned with the first groove and a second groove substantially aligned with the first projection, wherein the second hole is formed through an entire depth of the second tungsten body, the second tungsten body defining a substantially flat surface facing the first tungsten body; and
- a copper pin disposed in the first hole and the second hole, wherein the first tungsten body is removeably connected with the second tungsten body,
- wherein the copper pin operates as a flexible pivot point for reversibly pivoting the first tungsten body relative to the second tungsten body to capture a fishing line at a position spaced apart from the copper pin,
- wherein a size of the first tungsten body is substantially the same as a size of the second tungsten body,
- wherein the first tungsten body and second tungsten body are configured to pivot toward each other in a clamshell arrangement to capture the fishing line between the first tungsten body and the second tungsten body, and
- wherein the first tungsten body and the second tungsten body are configured to pivot away from each other in the clamshell arrangement to release the fishing line captured between the first tungsten body and the second tungsten body.

12. The fishing line weight of claim 11, wherein at least one of the first and second bodies has a substantially semi-circular shape.

13. The fishing line weight of claim 12, wherein when the first projection is disposed in the second groove and the second projection is disposed in the first groove, the first and second tungsten bodies form a substantially spherical shape.

14. The fishing line weight of claim 13, wherein the copper pin has a substantially cylindrical shape.

15. The fishing line weight of claim 14, wherein a first portion of the copper pin substantially fills the first hole, and wherein a second portion of the copper pin substantially fills the second hole.

16. The fishing line weight of claim 15, wherein an outermost end of the first portion of the copper pin is substantially flush with a side of the first tungsten body facing away from the first projection.

17. The fishing line weight of claim 11, wherein each of the first and second tungsten bodies have semi-circular shapes, and wherein a first flat surface of the first tungsten body is configured to be in direct contact with a second flat surface of the second tungsten body when pressure is applied to at least one of the first and second tungsten bodies along a length of the copper pin.

18. The fishing line weight of claim 17, wherein when the first projection is disposed in the second groove and the second projection is disposed in the first groove, the first and second tungsten bodies form a substantially spherical shape.

19. The fishing line weight of claim 11, wherein the copper pin projects through at least one of the first and second holes when the first and second tungsten bodies are in direct contact with each other.

20. The fishing line weight of claim 11, further including an insertion wedge formed in the second tungsten body, the insertion wedge defining a surface that is angled with respect to the substantially flat surface of the second tungsten body, wherein pressure applied to the surface of the insertion wedge pivots the second tungsten body away from the first tungsten body in the clamshell arrangement.

\* \* \* \* \*